United States Patent [19]
Mott

[11] Patent Number: 5,464,374
[45] Date of Patent: Nov. 7, 1995

[54] CHAIN HAVING IMPROVED LOAD DISTRIBUTION

[75] Inventor: Philip J. Mott, Dryden, N.Y.

[73] Assignee: Borg-Warner Automotive, Inc., Sterling Heights, Mich.

[21] Appl. No.: 285,174

[22] Filed: Aug. 3, 1994

[51] Int. Cl.⁶ ................................................ F16G 15/02
[52] U.S. Cl. .................................... 474/224; 474/228
[58] Field of Search .......................... 474/210, 212–214, 474/219, 220, 223–225, 228

[56] References Cited

U.S. PATENT DOCUMENTS

| | | |
|---|---|---|
| 772,351 | 10/1904 | Gartland ................................ 474/225 |
| 1,562,843 | 11/1925 | Muller .................................. 474/214 |
| 1,564,798 | 12/1925 | Sturtevant ......................... 474/214 X |
| 1,569,234 | 1/1926 | Muller .................................. 474/214 |
| 1,649,845 | 11/1927 | Muller .................................. 474/214 |
| 1,678,450 | 7/1928 | Sturtevant ......................... 474/214 X |
| 2,093,156 | 9/1937 | Muller .................................. 474/214 |
| 2,248,189 | 7/1941 | Pierce ................................ 474/214 X |
| 2,525,561 | 10/1950 | Pierce . | 
| 2,602,344 | 7/1952 | Bremer . |
| 3,340,745 | 9/1967 | McCann .............................. 474/214 |
| 3,540,302 | 11/1970 | Bendall . |
| 3,742,776 | 7/1973 | Avramidis . |
| 4,010,656 | 3/1977 | Jeffrey . |
| 4,186,617 | 2/1980 | Avramidis et al. ..................... 474/229 |
| 4,227,425 | 10/1980 | Bendall ................................ 474/213 |
| 4,342,560 | 8/1982 | Ledvina et al. ....................... 474/157 |
| 4,507,106 | 3/1985 | Cole, Jr. .............................. 474/215 |
| 4,547,182 | 10/1985 | Rattunde .............................. 474/214 |
| 4,758,210 | 7/1988 | Ledvina ............................... 474/212 |
| 4,759,740 | 7/1988 | Cradduck ............................ 474/212 |
| 4,911,682 | 3/1990 | Ivey et al. ............................ 474/245 |
| 4,915,675 | 4/1990 | Avramidis ........................... 474/213 |
| 5,147,251 | 9/1992 | Cole, Jr. .............................. 474/206 |
| 5,176,586 | 1/1993 | Sugimoto ............................ 474/212 |

FOREIGN PATENT DOCUMENTS 4-210144 7/1992 Japan .

Primary Examiner—Roger J. Schoeppel
Attorney, Agent, or Firm—Willian, Brinks, Hofer, Gilson & Lione; Greg Dziegielewski

[57] ABSTRACT

A power transmission chain includes pins and inner link apertures of a size to allow pivotal movement of the inner links about the pins. The ends of the pins and the outer link apertures are shaped such that upper and lower portions of the pin ends bear against upper and lower edge portions of the apertures to prevent movement of the outer links relative to the pins. At least one side portion of each pin is spaced apart from an adjacent side edge portion of the associate aperture.

21 Claims, 4 Drawing Sheets 5,464,374

CHAIN HAVING IMPROVED LOAD DISTRIBUTION

FIELD OF THE INVENTION

The present invention relates generally to a power transmission chain, and more particularly, to a chain configuration which substantially evenly distributes the loads acting on the links thereof to reduce pin bending. The present invention can be incorporated into any type of power transmission chain such as inverted tooth or silent chain, roller chain or chain for use with continuously variable transmissions.

BACKGROUND OF THE INVENTION

Power transmission chains are widely used in the automotive industry. Such chains are used for engine timing drives as well as for the transfer of power from the engine to the transmission or for the transfer of power in a transfer case. In continuously variable transmissions, power transmission chains or chain-belts are used to transfer power between a pair of variable pulleys. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. Each link has a body with a pair of spaced apertures and the apertures of one set of links are arranged and aligned with the apertures of the next adjacent set of interleaved links. Guide links are typically provided on the outside of the rows of links. The guide links are not designed to provide a driving contact, or power transfer, between the chain and the sprocket tooth. The guide links are intended to maintain the chain on the sprocket.

The inside or inverted tooth links have a pair of depending toes separated by a crotch. The links are connected by pivot means, which are typically round pins received in the apertures. The pivot means can also be rocker joints, which consist of pins and rockers. In a rocker joint chain, the pins rock against an associated rocker or aperture side. While the inverted tooth links pivot with respect to the pins, the ends of the pins are generally press fit into the apertures of the guide links to prevent rotation therewith. The pins are secured into the guide links by any means known in the art, such as caulking or welding, and are typically peened over on their ends. An example of a silent chain is found in U.S. Pat. No. 4,342,560, which is incorporated herein by reference. An example of a silent chain which can be used in engine timing applications is found in U.S. Pat. No. 4,759,740, which is also incorporated herein by reference.

Another type of chain is known as a "roller chain". A typical roller chain consists of alternate inner links and outer links. The inner links, which are also known as "bushing" links, consist of spaced link plates, or sidebars, with bushings tightly received in openings, or apertures, at each end of the sidebars. The outer links, which are also known as "guide" links, consist of spaced link plates, or sidebars, with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings. The rollerless chain contains bushings that directly contact the sprocket. Both types of roller chains are typically specified in industry as British standard chain and American National Standards Institute (ANSI) chain.

Another type of power transmission chain is used to transfer power between a pair of variable pulleys in a continuously variable transmission (CVT). The chain links are provided in sets that are interleaved together and have aligned apertures in the links that receive pivot means. Load blocks are positioned on the chain between the spaced pivot members and provide the means for transfer of power between the pulleys. The load blocks can be in the form of struts that are carried in a passageway below the links. Alternatively, the load blocks can extend around the links of the chain and have one or more windows for receiving the chain. The load blocks have tapered outer or end surfaces which engage the sheave faces of the pulleys to provide the driving engagement between the pulleys and the chain.

The pivot joints of a CVT typically include a pin and associated rocker to provide articulation of the links. The pins are generally press fit into the outside row of links. In certain types of CVT chains, the outside row of links comprises guide links which are provided for securing the pins. An example of power transmission chain suitable for use in a variable pulley transmission is shown in U.S. Pat. No. 4,911,682, and U.S. Pat. No. 4,507,106, which are incorporated herein by reference.

A conventional power transmission drive is comprised of either a silent chain or a roller chain wrapped about at least two sprockets supported by shafts, or a CVT chain wrapped about a pair of variable pulleys. The chain is endless and assembled from interconnected links that are adaptable to fit over and about teeth formed on the sprockets. Movement of a driving sprocket causes power transmission through the chain and consequent movement of at least one driven sprocket. In an engine timing drive application, the driving sprocket may be mounted on the engine crankshaft and the driven sprocket mounted on a valve camshaft. Timing drive applications can also include the use of a power transmission chain in the camshaft to camshaft drive in an overhead camshaft engine.

As described above, the pivot joints of a conventional silent chain, roller chain or CVT chain-belt typically include either round pins or rocker joints. In the round pin design, a generally round pin is fitted in a corresponding round aperture in the inverted tooth links or inside roller links. The round pin slides in the aperture as the links articulate around the sprocket. The round pins are press fit and secured into a guide link aperture on the outside of the chain. Similarly, the pins of a rocker joint are generally of greater length than the associated rocker and the pins are therefore press fit and secured into the aperture of the guide link on the outside row.

The present invention is an attempt to address the problem of unequal load sharing on the links across the length of the pins. Because the pins are normally press fit into the outer guide link apertures, the stiffness of the outer links tends to be greater than that of the inner links, which leads to unequal load sharing and pin bending. In the past, the uneven loads acting on the inner and outer links have been balanced by strengthening the inner links rather than weakening the outer links. The inner links have typically been strengthened by using a higher strength material, increasing their thickness, or doubling the links together to form a double-thickness link. The inner links have also been strengthened relative to the outer links by varying their lacing configuration to allow a desired amount of additional material to be added to end regions of the links. In U.S. Pat. No. 5,147,251, the disclosure of which is incorporated herein by reference, a three-way lacing configuration of a CVT belt is disclosed in which inner links in adjacent rows are staggered transversely in a lacing pattern which repeats every third row. To balance the tensile forces across the width of the chain, the links have varying thicknesses. In addition, the connecting elements have irregularly shaped end portions which are match-fit into similarly shaped apertures in the guide links.

Attempts have also been made at modifying the contour or configuration of the guide links to balance the forces acting on the guide links and toothed links. For example, U.S. Pat. No. 2,602,344 discloses a silent chain guide link having a crotch extending from the peripheral edge of the lower portion thereof and disposed between the pin apertures. The crotch compensates for the deflection or extension of toothed links to provide a balanced chain construction and distribute the shear loads across the chain pins evenly. The chain pins are the traditional rocker type pins which are fixedly secured to each aperture such that convex surfaces of adjacent pins bear against each other and allow pivotal movement of one link relative to another.

U.S. Pat. No. 4,227,425 discloses a self-centering joint comprising round apertures formed in the ends of both inner and outer link members. The apertures are larger in diameter than the cylindrical pins extending therethrough to provide clearance for the rocking joint action of the links on the pins. The pins have a ring portion for retaining the outer links and are free to rotate independently of the inner and outer links.

The present invention addresses the problem of unequal load sharing by providing a press fit of the pins into upper and lower edge portions of the outer guide link apertures while providing a space between the pins and the side edges of the apertures to balance the load acting upon the inner and outer links.

SUMMARY OF THE INVENTION

Briefly stated, the present invention is directed to a chain having guide links and pins configured to balance the distribution of loads across the length of the pins. The invention has application in inverted tooth chain, roller chain and chain for CVT applications.

The chain includes a plurality of inner links and outer guide links defining a plurality of parallel inner and outer rows. A plurality of pins connect the inner and outer links of interleaved rows. The inner and outer links have an aperture formed in oppositely extending end portions thereof for receiving a corresponding pin. The pins and inner link apertures are of a size to allow pivotal movement of the inner links about the pins. The ends of the pins and the guide link apertures are shaped such that upper and lower portions of the pin ends bear against upper and lower edge portions of the apertures to prevent movement of the outer links relative to the pins. At least one side portion of the pins is spaced apart from an adjacent side edge portion of the apertures to decrease the stiffness of the outer links and provide an even distribution of forces acting on the inner and outer links.

In a preferred embodiment, the guide link apertures are elliptical and end portions of the pins are cylindrical. The distance between upper and lower edge portions of the elliptical apertures is approximately the same as the diameter of the pin end portions to allow the pins to be press fit therein and prevent movement of the outer links relative to the pins. To decrease the stiffness of the outer links and provide a balanced load distribution acting on the inner and outer links, the distance between side edge portions of the outer link apertures is slightly larger than the diameter of the pin end portions. Alternatively, the pins may be specially shaped to fit within the round pin apertures and provide the above-described press fit and spaced relationships. The invention has application in the guide link apertures of round pin chains as well as the guide link apertures of rocker joint chains.

The present invention provides significant advantages. The elliptical apertures in the outer links reduce the stiffness of the outer links even though the pins are press fit therein. As a result, the inner and outer links share approximately the same load to prevent pin bending, and the outer links still provide sufficient guidance for the chain. The present invention addresses the problem of load distribution by providing pins which are press fit into outer guide link apertures while providing a space between the pins and the side edges of the apertures to balance the load acting upon the inner and outer links.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
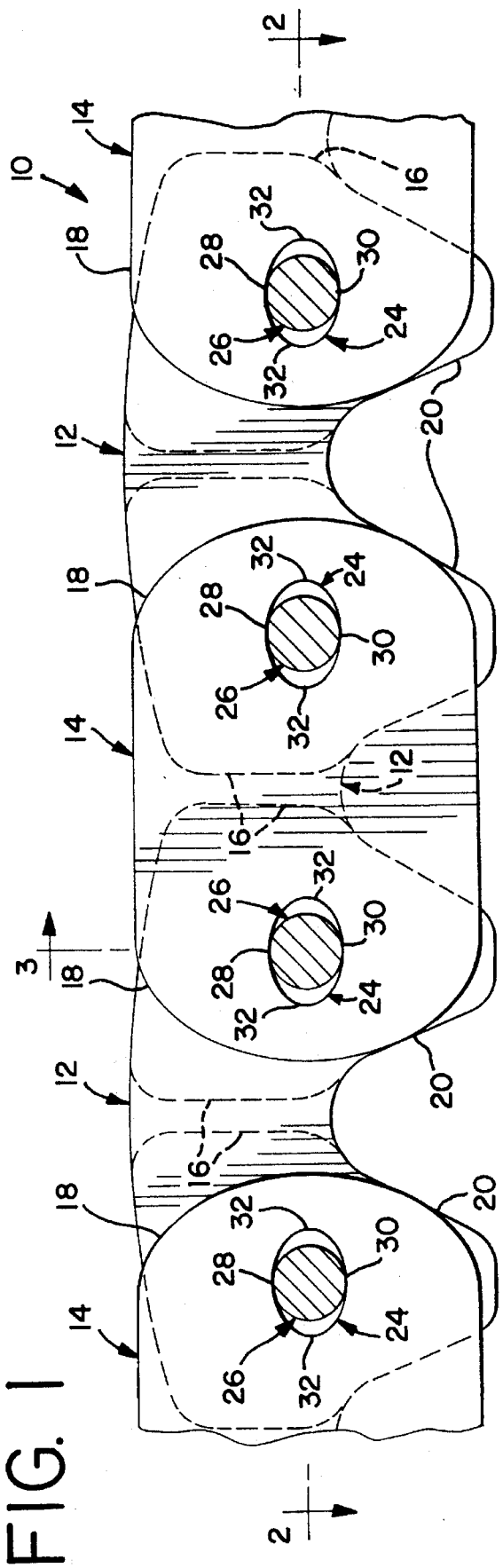
FIG. 1 is a side view of the chain of the present invention illustrating the plurality of outer guide links and inverted tooth inner links.
Figure 2:
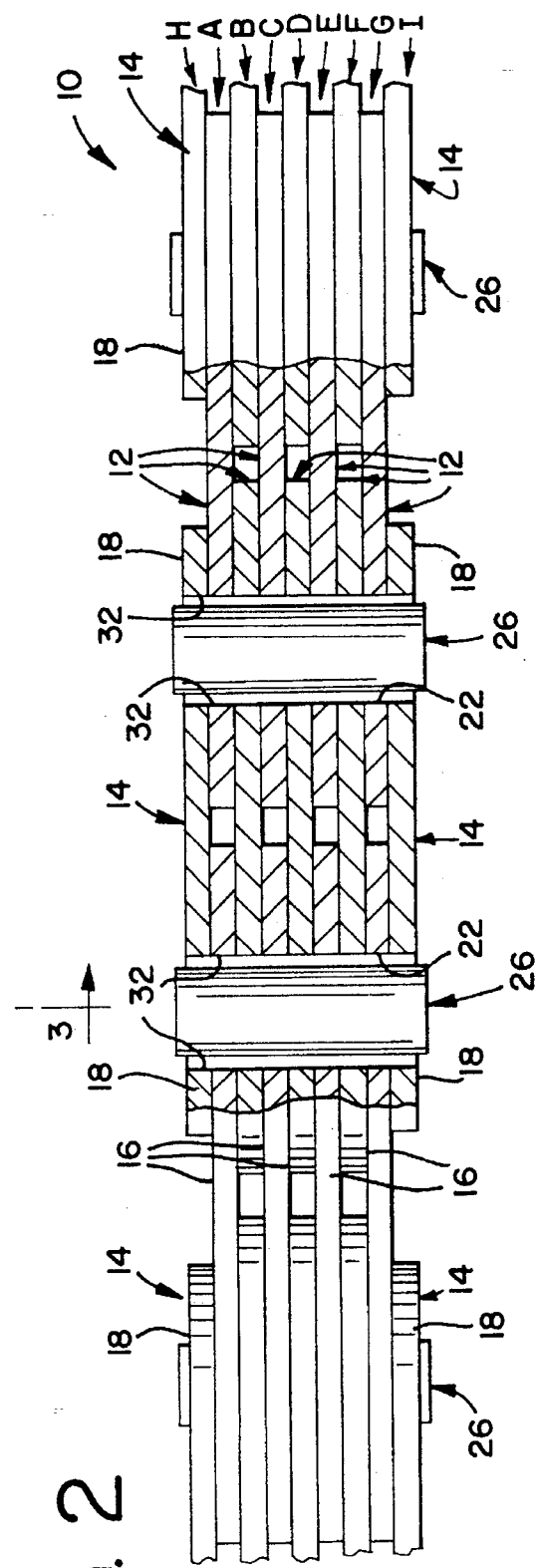
FIG. 2 is a top plan view of the chain of FIG. 1 showing a portion in cross-sectional view taken along the line 2—2 in FIG. 1.
Figure 3:
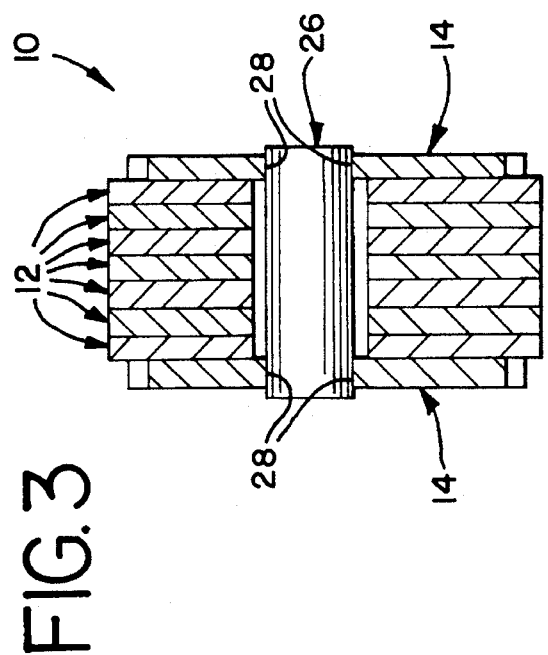
FIG. 3 is a cross-sectional view of the chain taken along the line 3—3 in FIG. 1.

Referring to the drawings, FIGS. 1–3 show a preferred embodiment of a chain indicated generally at 10. The chain 10 can be any type of power transmission chain as described above. The chain 10 includes a plurality of inner links 12 and a plurality of elongated outer guide links 14 preferably having the same thickness. The inner links 12 preferably define a plurality of parallel inner rows A–G positioned between the outer links 14 which define outer rows H and I. The inner links 12 in each row A–G are spaced apart and the inner links 12 in adjacent rows A–G are positioned alternately such that end portions 16 thereof overlap. Likewise, the outer links 14 in each row H and I are spaced apart and are positioned in alternate relation to the adjacent inner links 12 in rows A and G such that the inner link end portions 16 and outer link end portions 18 overlap.

Figure 4:
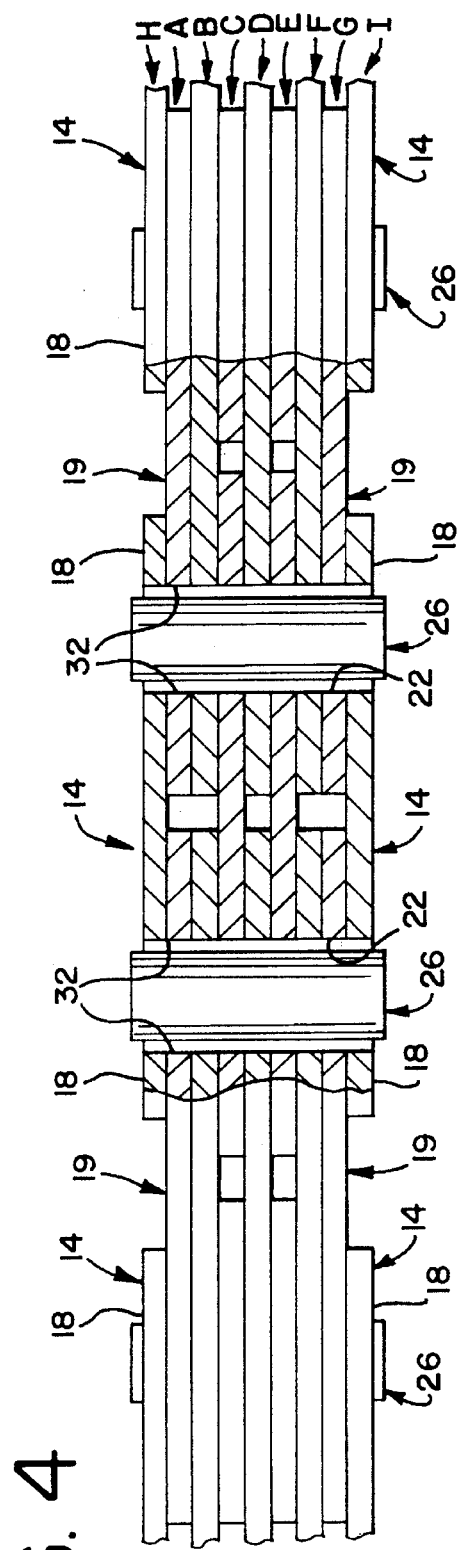
FIG. 4 is a top plan view of an alternative embodiment of the chain showing inner chain link pairs with a portion shown in cross-sectional view.

Any suitable number of inner rows can be provided and any desired lacing pattern can be used with the present invention. For example, a three-way lacing configuration can be provided in which the inner links in adjacent rows are staggered transversely in a pattern which repeats every third row. The inner links in such a lacing pattern can be lengthened relative to the outer links to strengthen the inner links and assist the balancing of the loads acting on the inner and outer links. Moreover, the inner links can be strengthened by using a higher strength material, increasing their thickness or doubling the inner links in adjacent rows to form double-thickness links 19 (FIG. 4).

In the silent chain, or inverted tooth chain shown in FIG. 1, each inner link 12 has a pair of downwardly extending tooth members 20 for engagement with a sprocket and a pair of apertures 22 formed in the end portions 16 thereof. Preferably, the outer links 14 have a pair of substantially elliptical apertures 24 formed in the end portions 18 thereof. A plurality of cylindrical pins 26 extend through the corresponding aligned apertures 22 in the inner links 12 and the ends thereof are press fit into the elliptical apertures 24 in the outer links 14. To allow pivotal movement of the inner links 12 about the pins 26, the diameter of the pins 26 is slightly smaller than the inner link apertures 22. To provide for the press fit and fixedly secure the pins 26 to the outer links 14, the distance between an upper edge portion 28 and a lower edge portion 30 of the outer link apertures 24 is approximately the same as the diameter of the pins 26.

Figure 5:
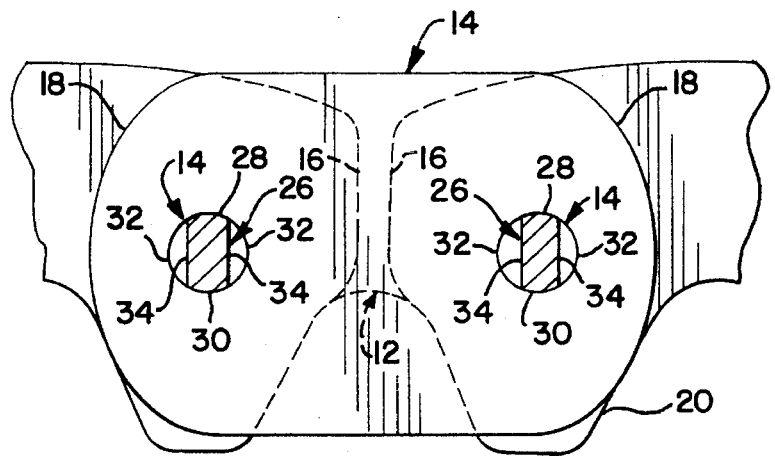
FIG. 5 is a side view of an alternative embodiment of the invention showing pivot pins with straight recesses therein and circular outer link apertures.
Figure 6:
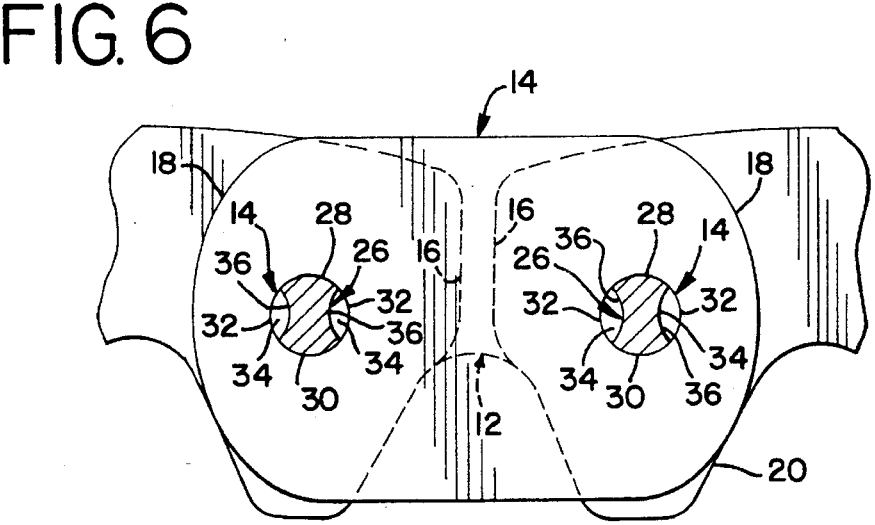
FIG. 6 is a side view of another embodiment of the invention showing pivot pins with concave recesses therein and circular outer link apertures.
Figure 7:
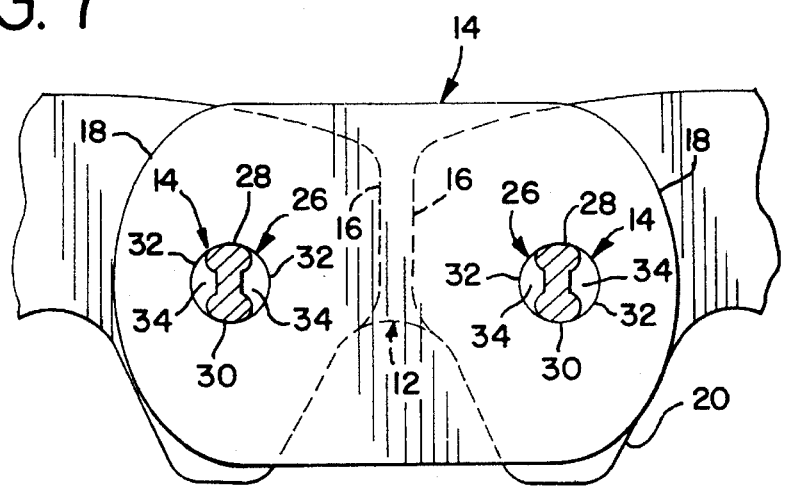
FIG. 7 is a side view of an yet another embodiment of the invention showing substantially I-shaped pivot pins and circular outer link apertures.

To decrease the stiffness of the outer links 14 and provide an even distribution of forces acting on the inner and outer links 12 and 14, the distance between side edge portions 32 of the elliptical apertures 14 is slightly larger than the diameter of the pins 26. The outer link apertures 14 need not be elliptical as long as the pins 26 are spaced apart from the side edge portions 32 thereof. A space between the pins 26 and only one side portion of the apertures 14 may be sufficient, and a pivot pin and rocker arrangement can be used. Alternatively, the shape of the pins may be modified for use with round apertures in the chain of the present invention. As shown in FIG. 5, the outer link apertures 14 can be substantially circular and the pins may be formed with a recess 34 formed in the pin. The recess may be substantially straight, as shown in FIG. 5, or the recess may be arcuate in nature, as shown in FIGS. 6 and 7. The pin shown in FIG. 6 has recesses 34 defined by concave side walls 36, while the pin shown in FIG. 7 has substantially I-shaped end portions with rounded corners.

Figure 8:
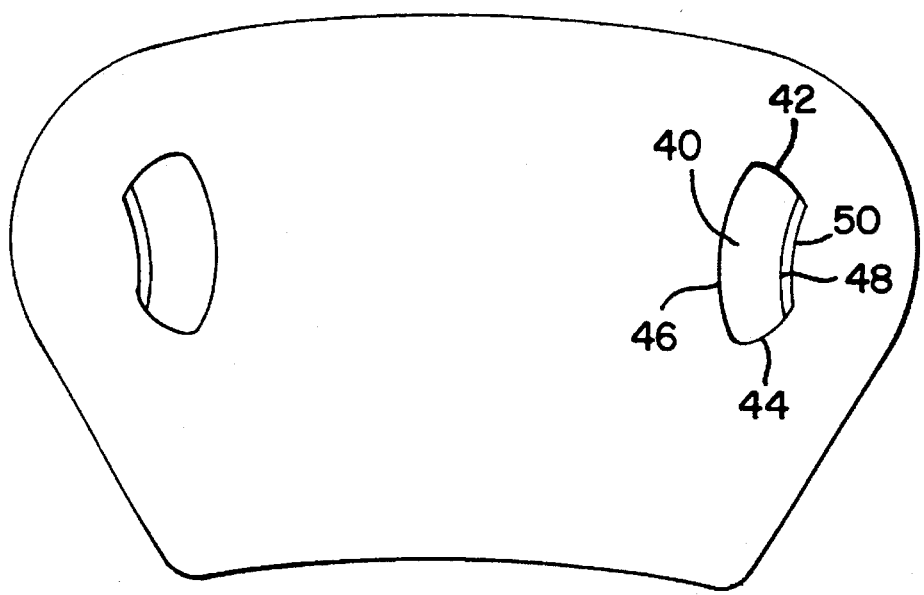
FIG. 8 is a side view of an alternate embodiment illustrating a guide link and pin from a rocker joint chain.
Figure 9:
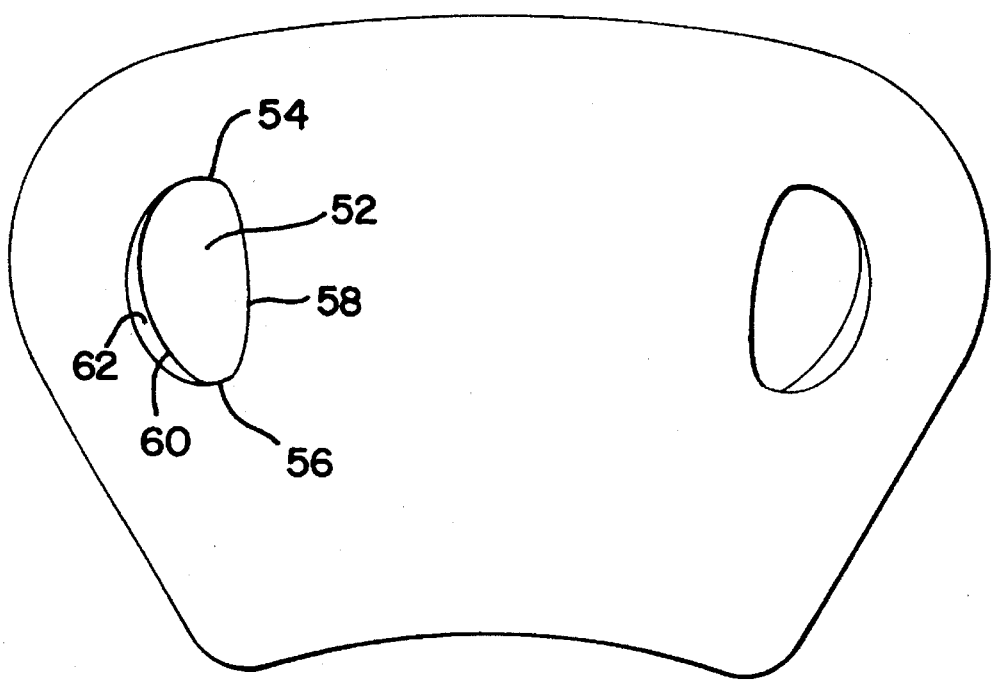
FIG. 9 is a side view of another alternate embodiment illustrating a guide link and pin from a rocker joint chain.

FIGS. 8 and 9 illustrate the guide link and pin in a rocker joint chain. In FIG. 8, the pins 40 have edges 42, 44 which are press fit in the aperture. Similarly, edge 46 of pin 40 is press fit in the aperture and is shaped for rocking engagement against an adjacent pin (not shown). The outside edge 48, or non-rocking edge, is in spaced-apart relation with the edge of aperture 50.

Similarly, in FIG. 9, the pins 52 have edges 54, 56, which are press fit in the aperture. Edge 58 is also press fit in the aperture and is shaped for rocking engagement against an adjacent pin or pivot number (not shown). The outside edge 60, or non-rocking edge, is in spaced-apart relation with the edge of aperture 62.

Thus, a chain is provided which attempts to more evenly balance the load distribution on the inner and outer links by reducing the stiffness of the outer guide links. The elliptical apertures allow the pins to be press fit in upper and lower edge portions thereof to provide sufficient guidance for the chain while the space between the pins and the side edges of the apertures reduces the stiffness of the outer links.

Although the present invention has been described with reference to preferred embodiments, those skilled in the art will recognize that many changes may be made in form and detail without departing from the spirit and scope of the invention. As such, it is intended that the foregoing detailed description be regarded as illustrative rather than limiting and that it is the appended claims which are intended to define the scope of the invention.

What is claimed is:

1. A chain comprising:
   a plurality of inner links defining a plurality of parallel inner link rows, each inner link having a pair of apertures formed in oppositely extending end portions thereof;
   a plurality of pins connecting the inner links of different inner link rows, said pins extending through corresponding apertures in the inner links and being of a size to allow movement of the inner links about the pins, said pins being of substantially uniform cross-sectional shape along the length of the pins; and
   a plurality of guide links at opposite outside ends of alternate rows of inner links, said guide links defining guide rows interleaved with said inner link rows, each guide link having a pair of apertures formed in oppositely extending end portions thereof for receiving a pin, the guide link apertures and ends of the pins being shaped such that upper and lower portions of the pins bear against upper and lower edge portions of the apertures to substantially prevent movement of the guide links relative to pins, and at least one side portion of each pin is in a spaced apart relationship from an adjacent side-edge portion of an associated guide link aperture.

2. The chain of claim 1, wherein said pins are substantially circular in cross-section and said guide link apertures are shaped to provide said spaced apart relationship between said side portions of said pins and said side-edge portions of said associated guide link apertures.

3. The chain of claim 1, wherein said guide link apertures are substantially circular and said pins have a cross-section shaped to provide said spaced apart relationship.

4. The chain of claim 1, wherein each side portion of said pins is spaced apart from each side-edge portion of each associated guide link aperture.

5. The chain of claim 4, wherein said pins are substantially circular in cross-section and said guide link apertures are shaped to provide said spaced apart relationship.

6. The chain of claim 4, wherein said guide link apertures are substantially elliptical and the pins are cylindrical.

7. The chain of claim 4, wherein said guide link apertures are circular and said pins have a cross-section shaped to provide said spaced part relationship.

8. The chain of claim 7, wherein said cross-sectional shape of said pins is defined by concave side walls which curve radially inward toward the center of the pin.

9. The chain of claim 7, wherein said cross-sectional shape of said pins defines a substantially I-shaped end portion of the pin.

10. The chain of claim 1 wherein at least one side portion of each of said pins is press fit against at least one side-edge portion of each associated guide link aperture.

11. A power transmission chain comprising:

a plurality of inner links defining a plurality of parallel inner link rows, each inner link having a pair of apertures formed in oppositely extending end portions thereof;

a plurality of pins connecting the inner links of different inner link rows, said pins extending through corresponding apertures in the inner links and being slightly smaller than the apertures to allow pivotal movement of the inner links about the pins; and a plurality of guide links at opposite outside ends of alternate rows of inner links, said guide links defining guide rows of inner links between which the inner link rows are positioned, each guide link having a pair of substantially elliptical apertures formed in opposite ends thereof for receiving a cylindrical end portion of a corresponding pin, the distance between upper and lower edge portions of the elliptical apertures being approximately the same as the diameter of the pin end portions to allow the pins to be press fit therein and substantially prevent movement of the guide link relative to the pins, and the distance between side edge portions of the aperture being slightly larger than the diameter of the pin end portions.

12. The chain of claim 11, wherein said guide links are elongated and the longitudinal centerline of said elliptical apertures are in alignment with the longitudinal centerline of said guide links.

13. The chain of claim 11, wherein said inner links and said guide links have substantially the same thickness.

14. The chain of claim 13, wherein the inner links and the guide links in adjacent rows are in alternate interleaving relation such that the end portions thereof overlap.

15. The chain of claim 14, wherein each inner link has a pair of downwardly extending tooth members for engagement with a sprocket.

16. The chain of claim 11, wherein a plurality of aligned pairs of inner links are positioned adjacent the guide links to create two parallel rows of inner links adjacent each row of guide links.

17. A power transmission chain including a plurality of pivot pins interconnecting a plurality of elongated guide links and inner links having downwardly extending tooth members said chain comprising:

said inner links defining a plurality of parallel inner link rows, the inner links in at least two adjacent inner rows being in alternating relation such that end portions thereof overlap, said overlapping end portions having an oversized aperture therein for receiving a corresponding pivot pin; and said guide links defining guide rows of inner links between which the inner link rows are positioned, each guide link having a pair of substantially elliptical apertures formed in opposite ends thereof for receiving a cylindrical end portion of a corresponding pivot pin, the longitudinal centerline of said elliptical apertures being in alignment with the longitudinal centerline of said guide link, and the end portions of each pin being press fit into said elliptical apertures in said guide links such that said pin end portions are fixedly secured to upper and lower edge portions of the elliptical apertures to substantially prevent pivotal movement of the guide links about the pin, the distance between side edge portions of said elliptical apertures being slightly larger than the diameter of said pin end portions.

18. The chain of claim 17, wherein the inner links and the guide links have substantially the same thickness.

19. The chain of claim 17, wherein a plurality of inner link pairs are positioned adjacent the guide links to create two parallel rows of inner links adjacent each row of guide links.

20. The chain of claim 17, further comprising a rocker member positioned adjacent each pivot pin, said rocker members extending through the apertures in the inner links and having a surface which slidably bears against said adjacent pivot pin to allow pivotal movement of the inner links.

21. The chain of claim 17, wherein the guide links have a recess formed in a lowermost edge portion thereof between said elliptical apertures.

* * * * *